United States Patent
LaBarge et al.

US006864213B2

(10) Patent No.: US 6,864,213 B2
(45) Date of Patent: Mar. 8, 2005

(54) ALKALINE EARTH / RARE EARTH LEAN $NO_X$ CATALYST

(75) Inventors: William J. LaBarge, Bay City, MI (US); Mark Hemingway, Columbiaville, MI (US); Joachim Kupe, Davisburg, MI (US); Galen B. Fisher, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 39 days.

(21) Appl. No.: 09/805,682

(22) Filed: Mar. 13, 2001

(65) Prior Publication Data

US 2002/0132725 A1 Sep. 19, 2002

(51) Int. Cl.$^7$ ................................. B01J 23/00
(52) U.S. Cl. .................... 502/302; 502/64; 502/340
(58) Field of Search ................. 502/302, 303, 502/64, 304, 340, 349, 350, 341, 240

(56) References Cited

U.S. PATENT DOCUMENTS

| | | | |
|---|---|---|---|
| 3,644,200 A | * 2/1972 | Young ................ 208/120 |
| 4,929,338 A | * 5/1990 | Wormsbecher ........ 208/120.25 |
| 4,988,660 A | * 1/1991 | Campbell ................ 502/303 |
| 5,051,392 A | * 9/1991 | Mabilon et al. .......... 502/303 |
| 5,053,372 A | * 10/1991 | Brownscombe ............ 502/60 |
| 5,319,929 A | * 6/1994 | Cornelison et al. .......... 60/274 |
| 5,380,692 A | * 1/1995 | Nakatsuji et al. ........... 502/303 |
| 5,545,604 A | * 8/1996 | Demmel .................... 208/113 |
| 5,727,385 A | 3/1998 | Hepburn |
| 5,733,837 A | * 3/1998 | Nakatsuji et al. ........... 502/304 |
| 5,879,645 A | 3/1999 | Park et al. |
| 5,906,958 A | 5/1999 | Park et al. |
| 5,990,038 A | 11/1999 | Suga et al. |
| 6,048,509 A | * 4/2000 | Kawai et al. .............. 423/230 |
| 6,518,213 B1 | * 2/2003 | Yamamoto et al. .......... 502/65 |

FOREIGN PATENT DOCUMENTS

| | | |
|---|---|---|
| EP | 1036591 A1 | 9/2000 |
| JP | 56002848 A | 1/1981 |
| JP | 2293050 A | 12/1990 |
| JP | 3267151 A | 11/1991 |
| JP | 4338233 A | 11/1992 |
| JP | 4367707 A | 12/1992 |
| JP | 5031367 A | 2/1993 |
| JP | 5192535 A | 8/1993 |
| JP | 5277376 A | 10/1993 |
| JP | 6226052 A | 8/1994 |
| JP | 7100386 A | 4/1995 |
| JP | 7136518 A | 5/1995 |
| JP | 7328440 A | 12/1995 |
| JP | 8010573 A | 1/1996 |
| JP | 8038888 A | 2/1996 |
| JP | 8038889 A | 2/1996 |
| JP | 8155303 A | 6/1996 |
| JP | 8229355 A | 9/1996 |
| JP | 8281110 A | 10/1996 |
| JP | 9103652 A | 4/1997 |
| JP | 9155185 A | 6/1997 |
| JP | 9225264 A | 9/1997 |
| JP | 9239276 A | 9/1997 |
| JP | 9248462 A | 9/1997 |
| JP | 9253453 A | 9/1997 |
| JP | 10057811 A | 3/1998 |
| JP | 10118457 A | 5/1998 |
| JP | 10118486 A | 5/1998 |
| JP | 10128114 A | 5/1998 |
| JP | 10165819 A | 6/1998 |
| JP | 10192713 A | 7/1998 |
| JP | 10290933 A | 11/1998 |
| JP | 11057477 A | 3/1999 |
| JP | 11169670 A | 6/1999 |
| JP | 11207190 A | 8/1999 |
| JP | 11221466 A | 8/1999 |
| JP | 11226404 A | 8/1999 |
| JP | 2003-117399 | 4/2003 |

\* cited by examiner

Primary Examiner—Stanley S. Silverman
Assistant Examiner—Edward M. Johnson
(74) Attorney, Agent, or Firm—Paul L. Marshall

(57) ABSTRACT

A catalyst for treating an exhaust gas stream comprising a $NO_x$ occluding catalyst structure having an outer layer comprising an alkaline earth component and a rare earth component.

24 Claims, No Drawings

ALKALINE EARTH / RARE EARTH LEAN $NO_x$ CATALYST

BACKGROUND OF THE INVENTION

The present invention relates to a catalyst for purifying exhaust gases from an internal combustion engine. In particular, it relates to a lean $NO_x$ catalyst.

It is well known in the art to use catalyst compositions, including those commonly referred to as three-way conversion ("TWC") catalysts to treat the exhaust gases of internal combustion engines. Such catalysts, containing precious metals like platinum, palladium, and rhodium, have been found both to successfully promote the oxidation of unburned hydrocarbons (HC) and carbon monoxide (CO) and to promote the reduction of nitrogen oxides ($NO_x$) in exhaust gas, provided that the engine is operated around balanced stoichiometry for combustion ("combustion stoichiometry"; i.e., between about 14.7 and 14.4 air/fuel (A/F) ratio).

However, fuel economy and global carbon dioxide ($CO_2$) emissions have made it desirable to operate engines under lean-burn conditions, where the air-to-fuel ratio is somewhat greater than combustion stoichiometry to realize a benefit in fuel economy. Diesel and lean-burn gasoline engines generally operate under highly oxidizing conditions (i.e., using much more air than is necessary to burn the fuel), typically at air/fuel ratios greater than 14.7 and generally between 19 and 35. Under these highly lean conditions, typical three-way catalysts exhibit little activity toward $NO_x$ reduction, as their reduction activity is suppressed by the presence of excess oxygen.

The control of $NO_x$ emissions from vehicles is a worldwide environmental problem. Lean-burn, high air-to-fuel ratio, and diesel engines are certain to become more important in meeting the mandated fuel economy requirements of next-generation vehicles. Development of an effective and durable catalyst for controlling $NO_x$ emissions under net oxidizing conditions accordingly is critical.

Recently, copper-ion exchanged zeolite catalysts have been shown to be active for selective reduction of $NO_x$ by hydrocarbons in the presence of excess oxygen. Platinum-ion exchanged zeolite catalyst is also known to be active for $NO_x$ reduction by hydrocarbons under lean conditions. However, this catalytic activity is significant only in a narrow temperature range around the lightoff temperature of hydrocarbon oxidation. All the known lean-$NO_x$ catalysts reported in the literature tend to lose their catalytic activity for $NO_x$ reduction when the catalyst temperature reaches well above the lightoff temperature of hydrocarbon oxidation. This narrow temperature window of the lean-$NO_x$ catalysts is considered to be one of the major technical obstacles, because it makes practical application of these catalysts difficult for lean-burn gasoline or diesel engines.). As an example, the Cu-zeolite catalysts deactivate irreversibly if a certain temperature is exceeded. Catalyst deactivation is accelerated by the presence of water vapor in the stream and water vapor suppresses the NO reduction activity even at lower temperatures. Also, sulfate formation at active catalyst sites and on catalyst support materials causes deactivation. Practical lean-$NO_x$ catalysts must overcome all three problems simultaneously before they can be considered for commercial use. In the case of sulfur poisoning, some gasoline can contain up to 1200 ppm of organo-sulfur compounds. Lean-$NO_x$ catalysts promote the conversion of such compounds to $SO_2$ and $SO_3$ during combustion. Such $SO_2$ will adsorb onto the precious metal sites at temperatures below 300° C. and thereby inhibits the catalytic conversions of CO, $C_xH_y$ (hydrocarbons) and $NO_x$. At higher temperatures with an $Al_2O_3$ catalyst carrier, $SO_2$ is converted to $SO_3$ to form a large-volume, low-density material, $Al_2(SO_4)_3$, that alters the catalyst surface area and leads to deactivation. In the prior art, the primary solution to this problem has been to use fuels with low sulfur contents.

Another alternative is to use catalysts that selectively reduce $NO_x$ in the presence of a co-reductant, e.g., selective catalytic reduction (SCR) using ammonia or urea as a co-reductant. Selective catalytic reduction is based on the reaction of NO with hydrocarbon species activated on the catalyst surface and the subsequent reduction of $NO_x$ to $N_2$. More than fifty such SCR catalysts are conventionally known to exist. These include a wide assortment of catalysts, some containing base metals or precious metals that provide high activity. Unfortunately, just solving the problem of catalyst activity in an oxygen-rich environment is not enough for practical applications. Like most heterogeneous catalytic processes, the SCR process is susceptible to chemical and/or thermal deactivation. Many lean-$NO_x$ catalysts are too susceptible to high temperatures, water vapor and sulfur poisoning (from $SO_x$).

Yet another viable alternative involves using co-existing hydrocarbons in the exhaust of mobile lean-burn gasoline engines as a co-reductant and is a more practical, cost-effective, and environmentally sound approach. The search for effective and durable non-selective catalytic reduction "NSCR" catalysts that work with hydrocarbon co-reductant in oxygen-rich environments is a high-priority issue in emissions control and the subject of intense investigations by automobile and catalyst companies, and universities, throughout the world.

A leading catalytic technology for removal of $NO_x$ from lean-burn engine exhausts involves $NO_x$ storage reduction catalysis, commonly called the "lean-$NO_x$ trap". The lean-$NO_x$ trap technology can involve the catalytic oxidation of NO to $NO_2$ by catalytic metal components effective for such oxidation, such as precious metals. However, in the lean $NO_x$ trap, the formation of $NO_2$ is followed by the formation of a nitrate when the $NO_2$ is adsorbed onto the catalyst surface. The $NO_2$ is thus "trapped", i.e., stored, on the catalyst surface in the nitrate form and subsequently decomposed by periodically operating the system under stoichiometrically fuel-rich combustion conditions that effect a reduction of the released $NO_x$ (nitrate) to $N_2$.

The lean-$NO_x$-trap technology has been limited to use for low sulfur fuels because catalysts that are active for converting NO to $NO_2$ are also active in converting $SO_2$ to $SO_3$. Lean $NO_x$ trap catalysts have shown serious deactivation in the presence of $SO_x$ because, under oxygen-rich conditions, $SO_x$ adsorbs more strongly on $NO_2$ adsorption sites than $NO_2$, and the adsorbed $SO_x$ does not desorb altogether even under fuel-rich conditions. Such presence of $SO_3$ leads to the formation of sulfuric acid and sulfates that increase the particulates in the exhaust and poison the active sites on the catalyst. Attempts with limited success to solve such a problem have encompassed the use of selective $SO_x$ adsorbents upstream of lean $NO_x$ trap adsorbents. Furthermore, catalytic oxidation of NO to $NO_2$ is limited in its temperature range. Oxidation of NO to $NO_2$ by a conventional Pt-based catalyst maximizes at about 250° C. and loses its efficiency below about 100 degrees and above about 400 degrees. Thus, the search continues in the development of systems that improve lean $NO_x$ trap technology with respect to temperature and sulfur considerations.

Another $NO_x$ removal technique comprises a non-thermal plasma gas treatment of NO to produce, $NO_2$ which is then combined with catalytic storage reduction treatment, e.g., a lean $NO_x$, trap, to enhance $NO_x$ reduction in oxygen-rich vehicle engine exhausts. In the lean $NO_x$ trap, the $NO_2$ from the plasma treatment is adsorbed on a nitrate-forming material, such as an alkali material, and stored as a nitrate. An engine controller periodically runs a brief fuel-rich condition to provide hydrocarbons for a reaction that decomposes the stored nitrate into benign products such as $N_2$. By using a plasma, the lean $NO_x$ trap catalyst can be implemented with known $NO_x$ adsorbers, and the catalyst may contain less or essentially no precious metals, such as Pt, Pd and Rh, for reduction of the nitrate to $N_2$. Accordingly, an advantage is that a method for $NO_x$ emission reduction is provided that is inexpensive and reliable. The plasma-assisted lean $NO_x$ trap can allow the life of precious metal lean $NO_x$ trap catalysts to be extended for relatively inexpensive compliance to $NO_x$ emission reduction laws. Furthermore, not only does the plasma-assisted lean $NO_x$ trap process improve the activity, durability, and temperature window of lean $NO_x$ trap catalysts, but it allows the combustion of fuels containing relatively high sulfur contents with a concomitant reduction of $NO_x$, particularly in an oxygen-rich vehicular environment.

What is needed in the art is an exhaust gas catalyst system having improved durability, as well as effective $NO_x$ management, over extended operating time. The present invention overcomes many of the shortcomings of the prior art.

SUMMARY OF THE INVENTION

Now, according to the present invention, a lean $NO_x$ catalyst is provided for use in a non-thermal plasma exhaust gas treatment system. The presently invented catalyst comprises a $NO_x$ occluding catalyst including an outer layer having an alkaline earth component and a rare earth component. Preferably, this outer layer comprises a calcined coating of an alkaline earth oxide carbon inhibitor and a rare earth partial oxidation enhancer.

Preferably, the $NO_x$ catalyst outer layer comprises an alkaline earth oxide component in a preferred amount of at least about 30 wt %; more preferred at least about 50 wt %; and, particularly preferred at least about 70 wt %. The rare earth oxide component preferably is not more than about 70 wt %; more preferably not more than about 50 wt %; and, particularly preferred not more than about 30 wt %.

The above-described and other features and advantages of the present invention will be appreciated and understood by those skilled in the art from the following detailed description, and appended claims.

DESCRIPTION OF PREFERRED EMBODIMENTS

There is significant amount of fine carbon particulate in an exhaust stream of a diesel engine. Plasma treatment can be utilized to eliminate such particulate material which does not want to travel through a plasma field. An ozone generating plasma reactor is designed such that there is a space velocity minimum of 100,000 volume exchanges per hour, and more preferred 500,000 volume exchanges per hour and greatly preferred with at least 1,000,000 exchanges per hour. This high space velocity prevents carbon accumulation in the plasma reactor.

However, high flow rates greater than 100,000 cannot be used through the $NO_x$ treatment catalyst bed because the $NO_x$ reduction process takes longer than those space velocities allow. Preferably, to accomplish high $NO_x$ conversion, a space velocity of less than 50,000 volume exchanges per hour, more preferred less than 35,000 volume exchanges per hour, and greatly preferred less than 20,000 volume exchanges per hour occur. But, lower flow rates allow the deposition of carbon particulate on the surface of the catalyst, although, since the material is particulate, it cannot travel to the internal location of the $NO_x$ active metal.

According to the present invention, a top layer of anti "coking" material is applied to the surface of the $NO_x$ catalyst. This layer of material comprises an alkaline earth in combination with a rare earth. Alkaline earths serve to limit carbon deposition on the catalyst bed by assisting oxidation of carbon to carbon monoxide or carbon dioxide. Limiting the carbon build-up prevents clogging of the passages of the catalyst structure. Rare earths serve to react with ozone, storing oxygen and providing oxygen to the alkaline earths. Rare earths with oxygen also can assist partial oxidation of organic products (CH to CHO) such as aldehydes, ketones, and carboxylic acids. Non-oxidized organics and fully oxidized organics are not effective for reducing $NO_x$ to $N_2$. Partially oxidized organics are very effective for reduction of $NO_x$ to $N_2$. Together, the rare earths and alkaline earths prevent buildup of deposits on the zeolite/aluminum oxide catalyst support surfaces. The rare earths and alkaline earths stabilize the surfaces of the zeolites and aluminum oxide, thereby extending and enhancing the life of the $NO_x$ to $N_2$ conversion function.

The alkaline earth component may be any alkaline earth. The preferred alkaline earth component is barium, strontium, and/or calcium. Calcium and/or strontium are more preferred; and, calcium is particularly preferred.

Suitable calcium compounds for introduction of the alkaline earth component include calcium succinate, calcium tartrate, calcium citrate, calcium acetate, calcium carbonate, calcium hydroxide, calcium oxylate, calcium oleate, calcium palmitate and calcium oxide. Calcium acetate, calcium oxylate, and calcium citrate are preferred; calcium oxylate and calcium citrate are more preferred; and, calcium citrate is particularly preferred.

Suitable strontium compounds for introduction of the alkaline earth component include strontium citrate, strontium acetate, strontium carbonate, strontium hydroxide, strontium oxylate and strontium oxide. Strontium acetate, strontium oxylate, and strontium citrate are preferred; strontium oxylate and strontium citrate are more preferred; and, strontium citrate is particularly preferred.

Suitable barium compounds for introduction of the alkaline earth component include barium butyrate, barium formate, barium citrate, barium acetate, barium oxylate, barium carbonate, barium hydroxide and barium oxide. Barium acetate, barium oxylate, and barium citrate are preferred, barium oxylate and barium citrate are more preferred; and, barium citrate is particularly preferred.

The rare earth component may be any rare earth. The preferred rare earth is lanthanum, cerium, and/or neodymium. Cerium and/or neodymium are more preferred; and, neodymium is particularly preferred.

Suitable neodymium compounds for introduction of the rare earth component include neodymium acetate, neodymium citrate, neodymium oxylate, neodymium salicylate, neodymium carbonate, neodymium hydroxide and neodymium oxide. Neodymium acetate, neodymium oxylate, and neodymium citrate are preferred; neodymium oxylate and neodymium citrate are more preferred; and, neodymium citrate is particularly preferred.

Suitable cerium compounds for introduction of the rare earth component include cerium formate, cerium citrate, cerium acetate, cerium salicylate, cerium carbonate, cerium hydroxide and cerium oxide. Cerium acetate, cerium oxylate, and cerium citrate are preferred; cerium oxylate and cerium citrate are more preferred; and, cerium citrate is particularly preferred.

Suitable lanthanum compounds for introduction of the rare earth component include lanthanum acetate, lanthanum citrate, lanthanum salicylate, lanthanum carbonate, lanthanum hydroxide and lanthanum oxide. Lanthanum acetate, lanthanum oxylate, and lanthanum citrate are preferred; lanthanum oxylate and lanthanum citrate are more preferred; and, lanthanum citrate is particularly preferred.

The surface area of the alkaline earth and rare earth may be stabilized with other oxides, such as oxides of silicon, titanium, and/or zirconium. Titanium and zirconium are preferred; zirconium is particularly preferred. The surface area stabilizer preferably comprises not more than about 7 wt %; more preferred at not more than about 5 wt %; and, particularly preferred not more than about 3 wt %.

Suitable zirconium compounds for introduction of the surface area stabilizer include zirconium acetylacetonate, zirconium n-butoxide, zirconium nitrate, zirconium tetraamine nitrate, zirconium tetraamine citrate, zirconium 2-ethylhexanoate, and zirconium isopropoxide. Zirconium tetraamine citrate, zirconium butoxide, and zirconium isopropoxide are preferred; zirconium butoxide and zirconium isopropoxide are more preferred; and, zirconium isopropoxide is particularly preferred.

Suitable titanium compounds for introduction of the surface area stabilizer include titanium oxylate, titanium ethoxide, titanium methoxide, titanium isopropoxide, zirconium n-butoxide. Titanium butoxide, titanium ethoxide, and titanium isopropoxide are preferred; titanium ethoxide and titanium isopropoxide are more preferred; and, titanium isopropoxide is particularly preferred.

Suitable silicon compounds for introduction of the surface area stabilizer include silicon acetate, tetraethoxysilane, tetramethoxysilane, vinyltrimethoxysilane, ureidopropyltriethoxysilane and aminopropylsilanetriol. Tetraethoxysilane, silicon acetate, and tetramethoxysilane are preferred; silicon acetate and tetramethoxysilane are more preferred; and, tetramethoxysilane is particularly preferred.

A ceramic binder also may be included to prevent dissolution and redistribution of particles. Possible binders include acidic aluminum oxide sol, alkaline aluminum oxide sol, and ammonium aluminum oxide sol. A soluble alkaline aluminum compound with a pH of at least 8 is a preferred binder. Ammonium aluminum oxide sol is particularly preferred. Preferably, the binder is included in an amount of at least about 2 wt % and less than about 6 wt %.

Suitable aluminum sources for the binder include aluminum oxide, boehmite and pseudoboehmite aluminum hydroxide sols. Acidic aluminum oxide sol is preferred, alkaline aluminum oxide sol is more preferred and ammonium aluminum oxide sol is greatly preferred.

A preferred calcined anti-coking pursuant to the present invention comprises at least about 30 wt % alkaline earth oxide carbon inhibitor, no more than about 59 wt % rare earth oxide partial oxidation enhancer, not more than about 7 wt % surface area stabilizer, and not more than about 4 wt % ceramic oxide binder. A more preferred calcined coating comprises at least about 50 wt % alkaline earth oxide carbon inhibitor, not more than about 42 wt % rare earth oxide partial oxidation enhancer, not more than about 5 wt % surface area stabilizer, and not more than about 3 wt % ceramic oxide binder. A particularly preferred calcined coating comprises about 70 wt % alkaline earth oxide carbon inhibitor, about 25 wt % rare earth oxide partial oxidation enhancer, about 3 wt % surface area stabilizer, and about 2 wt % ceramic oxide binder.

The $NO_x$ occluding catalyst typically comprises an alkaline earth exchanged zeolite and/or an alkaline earth alumina. Any type zeolite may be used; preferred zeolites include X type zeolite, Y type zeolite, and/or ZSM-5 type zeolite. A Y type zeolite is particularly preferred. A zeolite surface area of at least about 300 $m^2$/gram is preferred, at least about 400 $m^2$/g is more preferred, and a surface area of at least about 500 $m^2$/g is particularly preferred. The preferred zeolite average particle size is less than about 0.9 microns; more preferred are zeolite particles of an average size less than about 0.6 microns; and particularly preferred are zeolites having an average particle size less than about 0.3 microns. The zeolite particles preferably feature average pore sizes ranging from about 4 to about 10 angstroms ("A"), with average pore sizes ranging from about 7 to 8 A particularly preferred. It is preferred to stabilize the zeolite catalyst with the inclusion of a rare earth element. Inclusion of a lanthanum oxide stabilizer is particularly preferred. Preferably, the zeolite has a silica to alumina ratio of at least about 5 to about 8.

Preferably, the alumina has a surface area of at least about 150 $m^2$/gram; a surface area of at least about 200 $m^2$/g is more preferred; and, a surface area of at least about 250 $m^2$/g is particularly preferred. An average alumina pore size of at least about 40 A is preferred; a pore size of at least about 60 A is more preferred; and, a pore size of at least about 80 A is particularly preferred. Specific acidity ranging from about 50 mmoles (millimoles) n-butylamine/$m^2 \times 10^{-4}$ to about 500 mmoles n-butylamine/$m^2 \times 10^{-4}$ is preferred; a specific acidity of about 350 mmoles n-butlyamine/$m^2 \times 10^{-4}$ is particularly preferred.

Any alkaline earth element may be used as the active catalyst. For example, the active catalyst element may comprise calcium, strontium, and/or barium. The use of barium is particularly preferred. Tests have indicated that calcium-doped catalysts generally convert about 30% $NO_x$ to $N_2$; strontium-doped catalysts generally convert about 50% $NO_x$ to $N_2$; barium-doped catalysts generally convert about 70% $NO_x$ to $N_2$. Based on a desire in the industry to optimize conversion of $NO_x$ to $N_2$ at about 90% or better, barium is the particularly preferred occluding catalyst material.

Accordingly, Ba is the preferred occluding catalyst for both the zeolite and the alumina components of the present catalyst. The alumina matrix features enhanced trapping efficiency if it is doped with a material such as barium. In specific, nitrogen species can neutralize catalytically active sites. Barium is the most robust alkaline earth element for resistance to nitrogen poisoning. The alumina matrix provides sacrificial sites for nitrogen poisoning, thus precluding large polycyclic nitrogen compounds from entering and poisoning the small pores of the zeolite catalyst component. The zeolite catalyst component preferably comprises a barium content of about 18 wt % to about 36 wt %; about 24 wt % to about 30 wt % is particularly preferred. The alumina matrix catalyst component preferably has a barium content of at least about 14 wt %; at least about 21 wt % is more preferred; and, at least about 28 wt % is particularly preferred. Exhaust deposits of oil derived "glassy" compounds such as calcium phosphate and zinc phosphate can greatly reduce diffusion. High levels of alkaline earths, such as barium, prevent formation of these diffusion limiting barriers.

Suitable barium sources for preparation of a barium-alumina component include barium nitrate, barium acetate, barium hydroxide, barium ethoxide, barium isopropoxide, and/or barium 2-ethylhexanoate. Barium acetate, barium isopropoxide, and barium 2-ethylhexanoate are preferred. Barium 2-ethylhexanoate is particularly preferred.

Diesel engines and engines that are lean burn usually operate in the range of 150° C. to about 350° C. Barium alumina typically has $NO_x$ to $N_2$ conversions of ~40% at 300° C., ~80% at 350° C. and ~40% at 400° C. Barium zeolite typically has $NO_x$ to $N_2$ conversion of ~40% at 175° C., ~70 at 250° C. and ~40% at 350° C. As a vehicle warms to 150° C., 100% of the $N_2$ is formed on the barium zeolite. As the temperature increases to 250° C., 60% of the $N_2$ formed is on barium zeolite and 40% is on barium-alumina. As the temperature increases further to 350° C., 80% of the $N_2$ is formed on the barium-alumina and only 20% of the $N_2$ is formed on the barium-zeolite.

The alumina catalyst preferably comprises coarse aluminum oxide particles are having an average size ranging from about 10 to about 30 microns. The zeolite catalyst preferably comprises zeolite particles having an average size ranging from about 0.1 to about 0.3 microns. In an admixture of the alumina catalyst and the zeolite catalyst, the fine zeolites tend to fill in the void spaces around the coarse alumina particles. The small zeolites particles are densely packed. Exhaust does not flow easily through the dense packed zeolites. The aluminum oxide particles are mostly porous. Gasses can easily pass through the aluminum oxide particles to reach the zeolite particles.

The aluminum oxide particles providing the admixture matrix generally comprise agglomerations of small psuedocrystalline alumina particles typically of about 0.3 microns or less. The agglomerations preferably are larger than about 10 microns and less than about 30 microns. The alumina matrix is mixed with a Ba-zeolite catalyst component, typically featuring a particulate size ranging from about 0.1 to about 0.3 microns. In general, the smaller the zeolite particle, the more hydrothermally stable the zeolite becomes, thereby improving its long term activity. Preferably, the zeolite active catalysts are dispersed throughout the alumina matrix.

The following examples are provided to further describe the invention. The examples are intended to be illustrative in nature and are not to be construed as limiting the scope of the invention.

EXAMPLE I

Preparation of Calcium/neodymium Component

About 2900 grams calcium citrate, 580 grams neodymium citrate and 108 grams zirconium isopropoxide are ball milled for 4 hours then tape cast to a 30 micron layer. The dried tape cast layer is calcined to 500° C. for 4 hours.

Preparation of a Ba-Zeolite Component

Y-Zeolite with a silica to alumina ratio of 7, is mixed with a saturated barium-nitrate solution and heated to 80° C. for 4 hours. The solids are filtered then washed then calcined at 740° C. for 2 hours.

Preparation of a Ba-Alumina Component 1000 grams of Condea Vista pseudoboehmite alumina is dispersed in 1500 grams ethanol. 1000 grams of 18 wt % barium 2-ethylhexanote in toluene is mixed into the alumina ethanol mixture. The mixture is dried then calcined at 500° C. The calcined barium alumina is screened to less than 30 micron. The portion greater than 10 micron and less than 30 micron is used in the catalyst.

Preparation of Catalyst Monolith

About 650 grams Ca-Neodymium oxide, 220 grams Ba-Zeolite, 110 grams Ba-Alumina, 80 grams ammonium aluminum hydroxide sol and 1150 grams 0.1 N ammonium hydroxide are well mixed. Ceramic monoliths containing 600 cells/in$^3$ are washcoated with the mixture then calcined at 500° C. for 4 hours.

EXAMPLE II

Preparation of a Ba-Zeolite Component

Y-Zeolite with a silica to alumina ratio of 7, is mixed with a saturated barium-nitrate solution and heated to 80° C. for 4 hours. The solids are filtered then washed then calcined at 740° C. for 2 hours. The process is repeated at least 2 more times. The resulting material has barium-occupying sites that had contained sodium.

Preparation of a Ba-Alumina Component 1000 grams of Condea Vista pseudoboehmite alumina is dispersed in 1500 grams ethanol. 1000 grams of 18 wt % barium 2-ethylhexanote in toluene is mixed into the alumina ethanol mixture. The mixture is dried then calcined at 500° C. The calcined barium alumina is screened to less than 30 micron. The portion greater than 10 micron and less than 30 micron is used in the catalyst.

Preparation of Ba-Alumina/Zeolite Catalyst 700 grams barium-doped zeolite prepared as in Example II, 300 grams barium-aluminum oxide prepared as in Example II and 240 grams of Condea Vista Disperal Al 25/5 ammonium aluminum hydroxide sol at 25 wt % solids are mixed with 1000 grams water. The resulting slurry is coated on a 600 cell/in$^3$ cordierite monolith and calcined to 500° C. for 4 hours. The calcined washcoat weight is targeted to 3.0 g/in$^3$.

Preparation of Calcium/neodymium Catalyst

About 2900 grams calcium citrate, 580 grams neodymium citrate and 108 grams zirconium isopropoxide are ball milled for 4 hours then tape cast to a 30 micron layer. The dried tape cast layer is calcined to 500° C. for 4 hours. The calcined material is combined with 80 grams ammonium aluminum hydroxide sol and 1280 grams of a 0.1 M ammonium hydroxide solution.

Ceramic monoliths previously washcoated with 3 grams/in$^3$ Ba-Zeolite/Ba-Alumina are washcoated with calcium-neodymium catalyst then calcined to 500° C. for 4 hours. The calcined Ba-Zeolite/Ba-Alumina weight is targeted to 3.0 g/in$^3$. The calcined Ca-Neodymium weight is targeted to 1 g/in$^3$.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

We claim:

1. A catalyst for treating an exhaust gas stream comprising:
   a NOx occluding catalyst structure comprising an alkaline earth exchanged zeolite and having an outer layer,
   wherein the outer layer comprises at least about 50 weight percent alkaline earth component, and not more than about 42 weight percent rare earth component, based upon the total weight of the outer layer.

2. The catalyst of claim 1 wherein the outer layer comprises an alkaline earth component in an amount of at least about 70 weight percent and a rare earth component in an amount of not more than about 25 weight percent.

3. The catalyst of claim 1 wherein the alkaline earth component is selected from the group consisting of calcium, strontium, barium, and mixtures thereof.

4. The catalyst of claim 3 wherein the alkaline earth component is calcium.

5. The catalyst of claim 1 wherein the rare earth component is selected from the group consisting of lanthanum, cerium, neodymium, and mixtures thereof.

6. The catalyst of claim 5 wherein the rare earth component is neodymium.

7. The catalyst of claim 1 wherein the outer layer comprises a surface area stabilizer selected from the group consisting of oxides of silicon, titanium, zirconium, and mixtures thereof.

8. The catalyst of claim 7 wherein the surface area stabilizer comprises zirconium.

9. The catalyst of claim 7 wherein the outer layer comprises a surface area stabilizer in an amount not more than about 7 wt %.

10. The catalyst of claim 9 wherein the outer layer comprises a surface area stabilizer in an amount not more than about 3 wt %.

11. The catalyst of claim 1 wherein the outer layer comprises a binder selected from the group consisting of acidic aluminum oxide sol, alkaline aluminum oxide sol, ammonium aluminum oxide sol, and mixtures thereof.

12. The catalyst of claim 11 wherein the outer layer comprises an ammonium aluminum oxide sol binder.

13. A catalyst for treating an exhaust gas stream comprising a $NO_x$ occluding catalyst structure having an outer layer, comprising:
   an alkaline earth component;
   a rare earth component; and
   a binder wherein the binder is selected from the group consisting of acidic aluminum oxide sol, alkaline aluminum oxide sol, ammonium, aluminum oxide sol, and mixtures thereof, and is present in an amount of at least about 2 wt % and less than about 6 wt %.

14. A catalyst for treating an exhaust gas stream comprising:
   a $NO_x$ occluding catalyst structure comprising an alkaline earth exchanged zeolite and an alkaline earth alumina having an outer layer
   wherein the outer layer comprises at least about 50 wt % an alkaline earth oxide component, not more than about 42 wt % rare earth oxide component, a surface area stabilizer, and a ceramic oxide binder, based upon the total weight of the outer layer.

15. The catalyst of claim 14 for treating an exhaust gas stream comprising:
   a $NO_x$ occluding catalyst structure having an outer layer comprising about 70 wt % alkaline earth oxide component, about 25 wt % rare earth oxide component, about 3 wt % surface area stabilizer, and about 2 wt % ceramic oxide binder.

16. A catalyst for treating an exhaust gas stream comprising:
   a $NO_x$ occluding catalyst structure having an outer layer comprising at least about 70 wt % calcium oxide component, not more than about 25 wt % neodymium oxide component, not more than about 3 wt % zirconium surface area stabilizer, and at least about 2 wt % ammonium aluminum oxide sol binder.

17. A catalyst for treating an exhaust gas stream comprising:
   a $NO_x$ occluding catalyst structure comprising an alkaline earth exchanged zeolite and an alkaline earth alumina and having an outer layer comprising at least about 50 wt % alkaline earth oxide component, a rare earth oxide component, a surface area stabilizer, and a ceramic oxide binder.

18. A method for making a catalyst, comprising:
   combining a calcium compound and a neodymium compound with a support to form a calcium-neodymium catalyst;
   combining the calcium-neodymium catalyst with a binder;
   washcoating a substrate with the calcium-neodymium catalyst; and
   calcining the washcoated substrate.

19. The method of claim 18, wherein the calcium compound is selected from the group consisting of calcium succinate, calcium tartrate, calcium citrate, calcium acetate, calcium carbonate, calcium hydroxide, calcium oxylate, calcium oleate, calcium palmitate and calcium oxide.

20. The method of claim 19, wherein the neodymium compound is selected from the group consisting of neodymium acetate, neodymium citrate, neodymium oxylate, neodymium salicylate, neodymium carbonate, neodymium hydroxide and neodymium oxide.

21. The method of claim 20, wherein the substrate is selected from the group consisting of an alkaline earth exchanged zeolite, an alkaline earth alumina, and mixtures thereof.

22. The method of claim 21, wherein the binder is selected from the group consisting of acidic aluminum oxide sol, alkaline aluminum oxide sol, and ammonium aluminum oxide sol, and mixtures thereof.

23. The catalyst of claim 14, wherein said stabilizer is selected from the group consisting of oxides of silicon, titanium, zirconium, and mixtures thereof.

24. A catalyst for treating an exhaust gas stream, comprising:
   a catalyst structure comprising an alkaline earth exchanged zeolite and having an outer layer,
   wherein the outer layer comprises a rare earth oxide component and at least about 50 weight percent alkaline earth component, based upon the total weight of the outer layer.

* * * * *